United States Patent
Sugiyama et al.

(10) Patent No.: US 10,073,431 B2
(45) Date of Patent: Sep. 11, 2018

(54) PLC UNIT AND PROGRAMMABLE LOGIC CONTROLLER

(71) Applicant: Mitsubishi Electric Corporation, Tokyo (JP)

(72) Inventors: Midori Sugiyama, Tokyo (JP); Masahiro Uchikoshi, Tokyo (JP); Koichi Shinkai, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 133 days.

(21) Appl. No.: 15/102,762

(22) PCT Filed: Apr. 24, 2014

(86) PCT No.: PCT/JP2014/061582
§ 371 (c)(1),
(2) Date: Jun. 8, 2016

(87) PCT Pub. No.: WO2015/162760
PCT Pub. Date: Oct. 29, 2015

(65) Prior Publication Data
US 2016/0313719 A1  Oct. 27, 2016

(51) Int. Cl.
*G05B 9/00* (2006.01)
*G05B 9/02* (2006.01)
*G05B 19/05* (2006.01)

(52) U.S. Cl.
CPC .. *G05B 19/058* (2013.01); *G05B 2219/14006* (2013.01)

(58) Field of Classification Search
CPC ............ G11B 27/36; G11B 2020/1843; G01R 31/3177; G01R 31/31835
(Continued)

(56) References Cited

U.S. PATENT DOCUMENTS 6,049,578 A  4/2000 Senechal et al.
6,424,258 B1  7/2002 Claes
(Continued)

FOREIGN PATENT DOCUMENTS

CN  10148919 A  8/2009
CN  202321855 U  7/2012
(Continued)

OTHER PUBLICATIONS

Communication dated Jun. 2, 2016 from the Taiwanese Intellectual Property Office in counterpart Application No. 104110413.
(Continued)

*Primary Examiner* — Michael J Brown
(74) *Attorney, Agent, or Firm* — Sughrue Mion, PLLC; Richard C. Turner

(57) ABSTRACT

A programmable logic controller system has: an input unit system section in which plural input units are combined; a CPU unit system section in which plural CPU units are combined; and an output unit system section in which plural output units are combined. Each system section has: a setting retaining unit to retain a setting indicating whether to use any of the plural units alone or use the plural units in a multiplexed manner; and a comparing unit to make a comparison of processed data between the plural units when the setting indicates using the plural units in a multiplexed manner, to send the processed data if the comparison result indicates consistency, and to perform an error process if the comparison result indicates inconsistency. In the setting retaining unit, whether to use alone or in a multiplexed manner is set based on an externally-input setting instruction.

5 Claims, 11 Drawing Sheets

(58) Field of Classification Search
USPC .......................................................... 700/79
See application file for complete search history.

(56) References Cited

U.S. PATENT DOCUMENTS

| | | | |
|---|---|---|---|
| 6,532,508 | B2 | 3/2003 | Heckel et al. |
| 7,428,659 | B2 | 9/2008 | Nagano et al. |
| 7,752,341 | B2 | 7/2010 | Kawaguchi |
| 2008/0104663 | A1* | 5/2008 | Tokutani ............. G06F 21/6218 726/1 |
| 2014/0018939 | A1 | 1/2014 | Ota et al. |
| 2014/0032970 | A1 | 1/2014 | Hovi et al. |
| 2014/0119233 | A1* | 5/2014 | Palani .................... H04B 3/544 370/254 |

FOREIGN PATENT DOCUMENTS

| | | |
|---|---|---|
| CN | 102694365 A | 9/2012 |
| JP | 06-131017 A | 5/1994 |
| JP | 2000-040060 A | 2/2000 |
| JP | 2000322102 A | 11/2000 |
| JP | 2002501228 A | 1/2002 |
| JP | 2002-140206 A | 5/2002 |
| JP | 2002-358106 A | 12/2002 |
| JP | 2003-502770 A | 1/2003 |
| JP | 2003-324438 A | 11/2003 |
| JP | 2004-062872 A | 2/2004 |
| JP | 2007-242036 A | 9/2007 |
| JP | 2007-299102 A | 11/2007 |
| JP | 2008-108196 A | 5/2008 |
| JP | 2008226111 A | 9/2008 |
| JP | 2010-033245 A | 2/2010 |
| JP | 2010-191943 A | 9/2010 |
| JP | 2011-028685 A | 2/2011 |
| JP | 2011-170680 A | 9/2011 |
| JP | 2011180665 A | 9/2011 |
| JP | 2012-194683 A | 10/2012 |
| JP | 2012223629 A | 11/2012 |
| JP | 2014-502242 A | 1/2014 |
| JP | 2014-075105 A | 4/2014 |
| TW | 383372 | 3/2000 |

OTHER PUBLICATIONS

Communication dated Mar. 3, 2017, from the Intellectual Property Office of Taiwan in counterpart application No. 105127867.
International Search Report for PCT/JP2014/061582 dated Aug. 5, 2014 [PCT/ISA/210].
Written Opinion for PCT/JP2014/061582 dated Aug. 5, 2014 [PCT/ISA/237].
Notice of Rejection issued in the corresponding Japanese Application No. 2015-524524 dated Jul. 17, 2015.
Notice of Rejection issued in the corresponding Japanese Application No. 2015-524524 dated Dec. 10, 2015.
Communication dated Jan. 24, 2017 from the Intellectual Property Office of Japan in counterpart Application No. 2016-025042.
Communication dated Mar. 30, 2018, from Korean Intellectual Property Office in counterpart application No. 10-2016-7015109.
Communication dated Apr. 19, 2018, from the State Intellectual Property Office of People's Republic of China in counterpart Application No. 201480078029.X.

* cited by examiner

PLC UNIT AND PROGRAMMABLE LOGIC CONTROLLER

CROSS REFERENCE TO RELATED APPLICATIONS

This application is a National Stage of International Application No. PCT/JP2014/061582 filed Apr. 24, 2014, the contents of all of which are incorporated herein by reference in their entirety.

FIELD

The present invention relates to a PLC unit and a programmable logic controller that comply with a functional safety standard.

BACKGROUND

Conventionally, a unit complying with a safety integrity level (hereinafter referred to as SIL, Safety Integrity Level) 2 of IEC61508 functional safety standard is required to have a safe failure fraction (hereinafter referred to as SFF, Safe Failure Fraction) defined by the IEC61508 safety standard of 90% or more, in a case where a system tolerance against failure (hereinafter referred to as HFT, Hardware Fault Tolerance) is 0. Further, a unit complying with the SIL2 is required to have the SFF of 60% or more, in a case where the HFT is 1. Here, the HFT being 0 means that system functions are lost due to a failure of one system function. The HFT being 1 means that the system functions are lost due to failures of two system functions.

Further, a unit complying with an SIL3 that requires higher safety than in the case of the SIL2 is required to have the SFF of 99% or more in a case where the HFT is 0. Further, a unit complying with the SIL3 is required to have the SFF of 90% or more in a case where the HFT is 1 and the SFF of 60% or more in a case where the HFT is 2. Here, the HFT being 2 means that the system functions are lost due to failures of three system functions.

In general, it is necessary for increasing the SFF to use components with higher grade or a large number of components, which leads to an increase in manufacturing cost of the unit. Therefore, in some cases, the following method is applied to an SIL3-compliant unit; that is, dualizing an internal component to achieve the HFT of 1 by a single unit, thereby satisfying the SIL requirements with suppressing the SFF to be low. It should be noted here that dualizing/dualization means that the same process is executed in parallel.

A method that uses two SIL2-compliant units by dualization for reducing a cost of system construction is known. That is, although a single unit with the SFF of 90% or more and less than 99% does not comply with the SIL3, using such two units in a dualized manner can comply with the SIL3. In other words, a unit with the SFF of 90% or more and less than 99% does not comply with the SIL3 when the HFT is 0 but can comply with the SIL3 when the HFT is made to be 1.

Moreover, Patent Document 1 discloses a technique in which an input/output device, which complies with the SIL2 when used alone, is dualized to comply with the SIL3.

CITATION LIST

Patent Literature

Patent Literature 1: Japanese Patent Application Laid-Open No. 2010-191943

SUMMARY

Technical Problem

In a case where two units are used by dualization, it is necessary to check and verify whether input/output signals of the respective units are consistent or not. However, in a case of a programmable logic controller that is configured by combining a CPU unit, an input unit, and an output unit, the input unit and the output unit are not provided with a master function that communicates information with units other than the CPU unit. Therefore, in a case where a programmable logic controller is configured by using two units by dualization, the CPU unit needs to perform all operations of comparing the input/output signals of the respective units, which causes deterioration of response performance. When the response performance becomes low, a safety distance becomes longer and thus safety cannot be assured. Thus, when an SIL3-compliant programmable logic controller is constructed by dualizing an SIL2-compliant unit, a use application of such the programmable logic controller is limited. Note that, in the following description, each of the CPU unit, the input unit and the output unit is collectively referred to as a PLC unit.

According to Patent Document 1, a system safety level is increased by dualizing the input/output device. However, if a programmable logic controller is constructed by merely dualizing an SIL2-compliant unit, as in the case of the input/output device of Patent Document 1, the above-mentioned problem that the use application is limited is caused.

On the other hand, when an SIL2-compliant programmable logic controller is constructed by using an SIL3-compliant unit, reliability and redundancy of each unit becomes excessive, which causes increase in costs required for the system construction.

In view of the above, it is currently necessary to separately prepare units for an SIL2-compliant programmable logic controller and units for an SIL3-compliant programmable logic controller. However, demand for integrating these units for the purpose of cost reduction and the like is increasing.

The present invention has been made in view of the above, and an object thereof is to achieve a PLC unit and a programmable logic controller that can comply with both the SIL2 and SIL3 without increasing load of the CPU unit and without making the reliability and redundancy of each unit excessive.

Solution to Problem

To solve the above-mentioned problem and achieve the object, the present invention provides a PLC unit that is mounted on a base provided with a system bus and configures a programmable logic controller together with another PLC unit. The PLC unit comprises: a system bus interface functioning unit directly sending and receiving data through the system bus to and from another PLC unit mounted on the base; a dualization setting retaining unit retaining a setting indicating whether to use the PLC unit alone or by dualization with another PLC unit; and an information comparing unit making a comparison between processed information obtained from another PLC unit being a counterpart of the dualization through the system bus interface functioning unit and processed information obtained by an internal process. In a case where the setting indicates using the PLC unit by the dualization together with another PLC unit, and when a result of the comparison by the information comparing unit indicates consistency, the PLC unit sends the processed information to a safety output device or another PLC unit different from a counterpart of the dualization processing the processed information. When the result of the comparison indicates inconsistency, the PLC unit performs an error process.

Advantageous Effects of Invention

The PLC unit and the programmable logic controller according to the present invention achieve an effect of complying with both the SIL2 and SIL3 without increasing load of the CPU unit and without making the reliability and redundancy of each unit excessive.

DESCRIPTION OF EMBODIMENTS

Hereinafter, embodiments of a PLC unit and a programmable logic controller according to the present invention will be described in detail with reference to the drawings. It should be noted that the invention is not limited to the embodiments.

Embodiments

Figure 1:
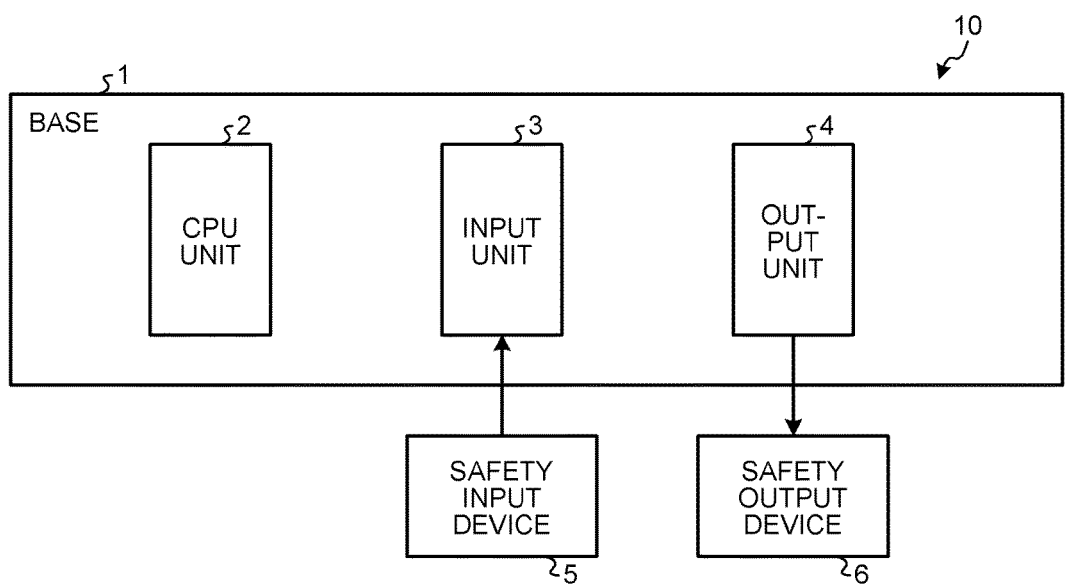
FIG. 1 is a diagram illustrating a configuration of an embodiment of a programmable logic controller using a PLC unit according to the present invention.

FIG. 1 is a diagram illustrating a configuration of an embodiment of a programmable logic controller using a PLC unit according to the present invention. A programmable logic controller 10 has a base 1, a CPU unit 2, an input unit 3, and an output unit 4.

The CPU unit 2 executes a sequence program based on an input value inputted from the input unit 3 to generate an output value, and outputs the generated output value to the output unit 4. The input unit 3 receives an input signal from a safety input device 5, and outputs the input value being a value indicated by the input signal to the CPU unit 2. The output unit 4 receives the output value from the CPU unit 2, and outputs the same as an output signal to a safety output device 6. Here, the safety input device 5 is an external device that can be connected to the input unit 3, and is a device that sends the input signal to the input unit 3. As an example thereof, the safety input device 5 may be an emergency stop button or a light curtain. The safety output device 6 is an external device that can be connected to the output unit 4, and is a device that receives the output signal from the output unit 4. As an example thereof, the safety output device 6 may be a safety relay, a connector, or a safety function-quipped driving device.

Each of the CPU unit 2, the input unit 3, and the output unit 4 has the SFF of 90% or more. Accordingly, the programmable logic controller 10 complies with the SIL2.

Figure 2:
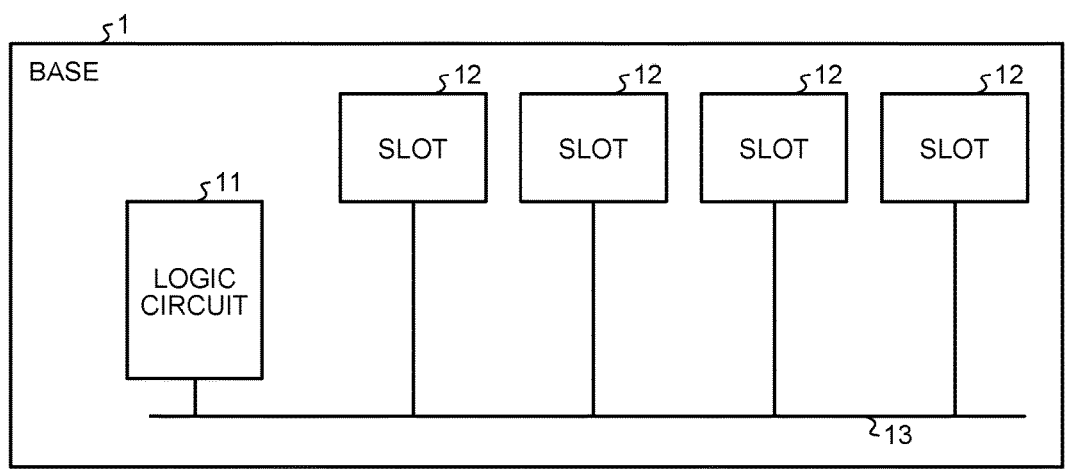
FIG. 2 is a diagram illustrating a configuration of a base.

FIG. 2 is a diagram illustrating a configuration of the base. The base 1 has a logic circuit 11, a plurality of slots 12, and a system bus 13 connecting the plurality of slots 12.

Figure 3:
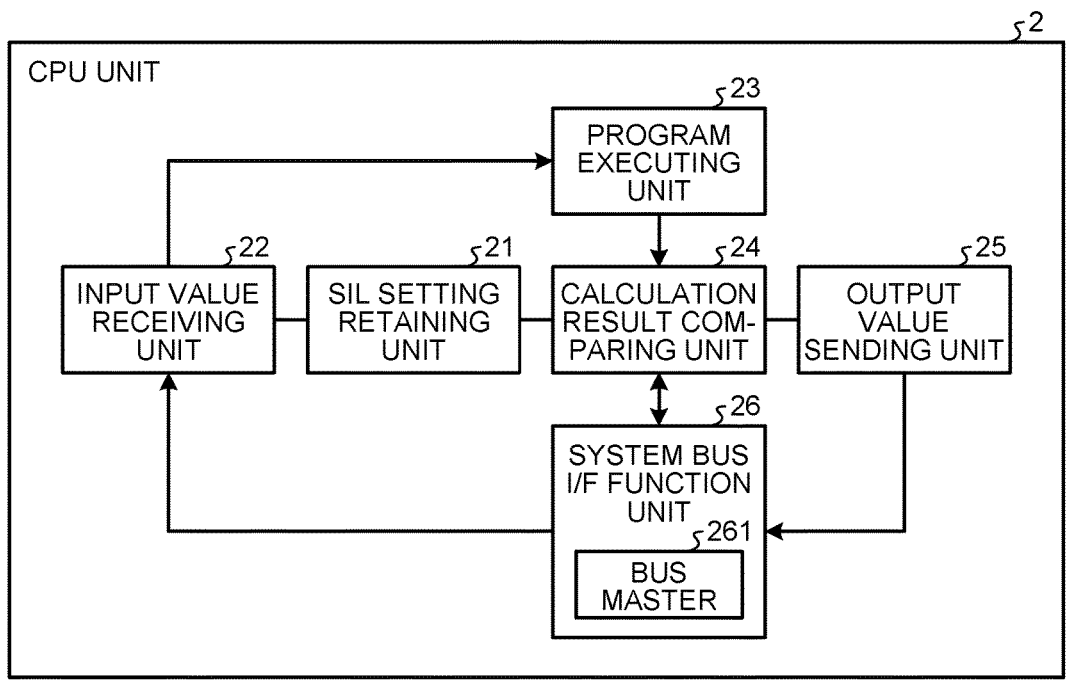
FIG. 3 is a diagram illustrating a configuration of a CPU unit.

FIG. 3 is a diagram illustrating a configuration of the CPU unit. The CPU unit 2 has an SIL setting retaining unit 21, an input value receiving unit 22, a program executing unit 23, a calculation result comparing unit 24, an output value sending unit 25, and a system bus interface functioning unit (hereinafter referred to as a system bus I/F function unit) 26. The system bus I/F function unit 26 includes a bus master 261.

The SIL setting retaining unit 21 is a dualization setting retaining unit that retains a setting indicating which of the SIL2 and the SIL3 the CPU unit complies with, namely, a setting indicating whether to use the CPU unit alone or by dualization with another CPU unit. The input value receiving unit 22 receives the input value sent from the input unit 3. The program executing unit 23 executes the sequence program on the basis of the input value received by the input value receiving unit 22 to generate the output value. The calculation result comparing unit 24 compares the calculation result and a calculation result of another CPU unit 2 being a counterpart of the dualization. The output value sending unit 25 sends the calculation result as the output value to the output unit 4. The system bus I/F function unit 26 is an interface for sending and receiving information through the system bus 13. The bus master 261 has a function of communicating information with other arbitrary units connected to the system bus 13.

Figure 4:
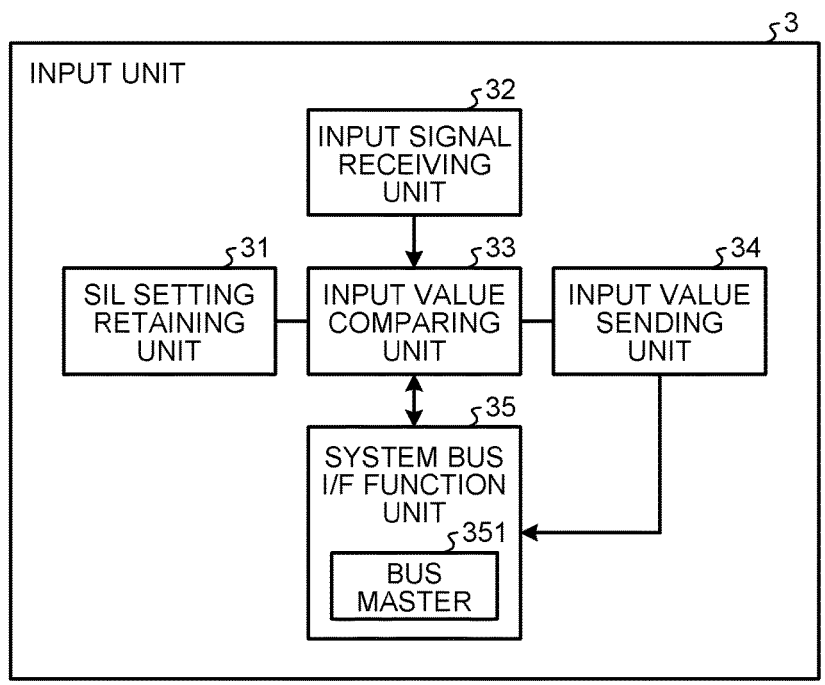
FIG. 4 is a diagram illustrating a configuration of an input unit.

FIG. 4 is a diagram illustrating a configuration of the input unit. The input unit 3 has an SIL setting retaining unit 31, an input signal receiving unit 32, an input value comparing unit 33, an input value sending unit 34, and a system bus I/F function unit 35. The system bus I/F function unit 35 includes a bus master 351.

The SIL setting retaining unit 31 is a dualization setting retaining unit that retains a setting indicating which of the SIL2 and the SIL3 the input unit complies with, namely, a setting indicating whether to use the input unit alone or by dualization with another input unit. The input signal receiving unit 32 receives the input signal from the safety input device 5. The input value comparing unit 33 compares the input value and an input value of another input unit 3 being a counterpart of the dualization. The input value sending unit 34 sends the input signal as the input value to the CPU unit 2. The system bus I/F function unit 35 is an interface for sending and receiving information through the system bus 13. The bus master 351 has a function of communicating information with other arbitrary units connected to the system bus 13.

Figure 5:
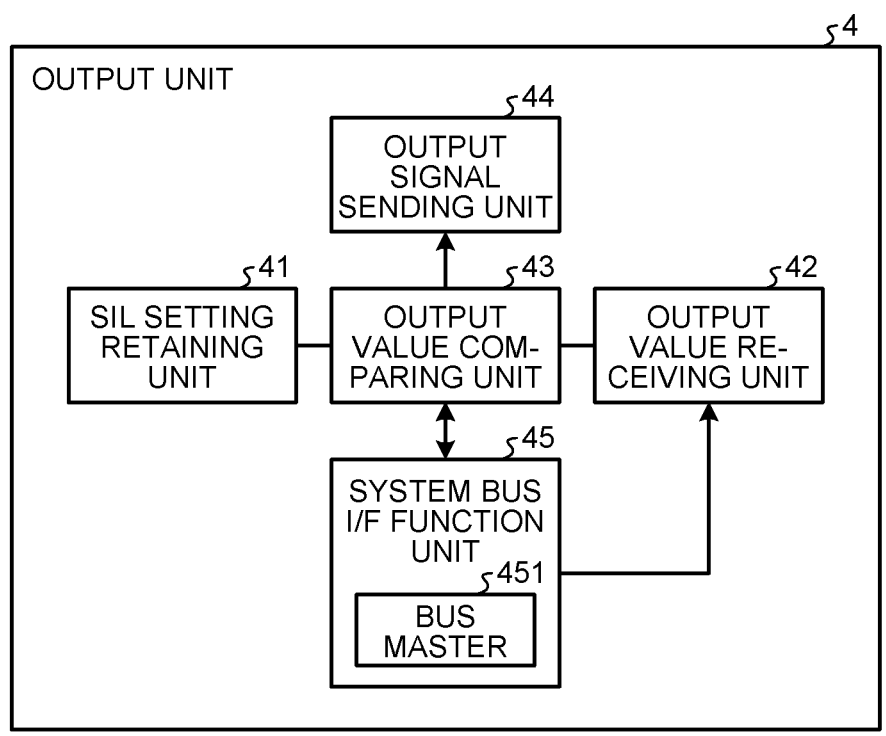
FIG. 5 is a diagram illustrating a configuration of an output unit.

FIG. 5 is a diagram illustrating a configuration on the output unit. The output unit 4 has an SIL setting retaining unit 41, an output value receiving unit 42, an output value comparing unit 43, an output signal sending unit 44, and a system bus I/F function unit 45. The system bus I/F function unit 45 includes a bus master 451.

The SIL setting retaining unit 41 is a dualization setting retaining unit that retains a setting indicating which of the SIL2 and the SIL3 the output unit complies with, namely, a setting indicating whether to use the output unit alone or by dualization with another output unit. The output value receiving unit 42 receives the output value from the CPU unit 2. The output value comparing unit 43 compares the output value and an output value of another output unit 4 being a counterpart of the dualization. The output signal sending unit 44 sends the output value as the output signal to the safety output device 6. The system bus I/F function unit 45 is an interface for sending and receiving information through the system bus 13. The bus master 451 has a function of communicating information with other arbitrary units connected to the system bus 13.

A communication method will be described below. The CPU unit 2, and the input unit 3 and the output unit 4 being controlled units are mounted on the base 1. The bus masters 261, 351, 451 of the CPU unit 2, the input unit 3, and the output unit 4 each has a master function that can send an access request command to any unit mounted on the base 1.

As an example of an operation at a time of communication, the input unit 3 sends an access request command to the output unit 4 through the system bus 13. Then, the logic circuit 11 reads the access request command and sends a select signal to the output unit 4 being the access destination. The output unit 4 having received the select signal returns a response to the input unit 3 through the system bus 13.

The CPU unit 2, the input unit 3, and the output unit 4 configuring the programmable logic controller 10 retain, in the respective SIL setting retaining units 21, 31, and 41, information indicating the SIL2-compliant setting, namely, information that indicates using the unit alone. It should be noted here that the following methods can be applied for switching the setting between the SIL2-compliant setting and the SIL3-compliant setting, namely, switching between the setting of using the unit alone and the setting of using the unit in a dualized manner; that is, such methods as changing the setting by connecting an engineering tool to the programmable logic controller 10, or providing each unit with a setting switching switch or an external pin.

Figure 6:
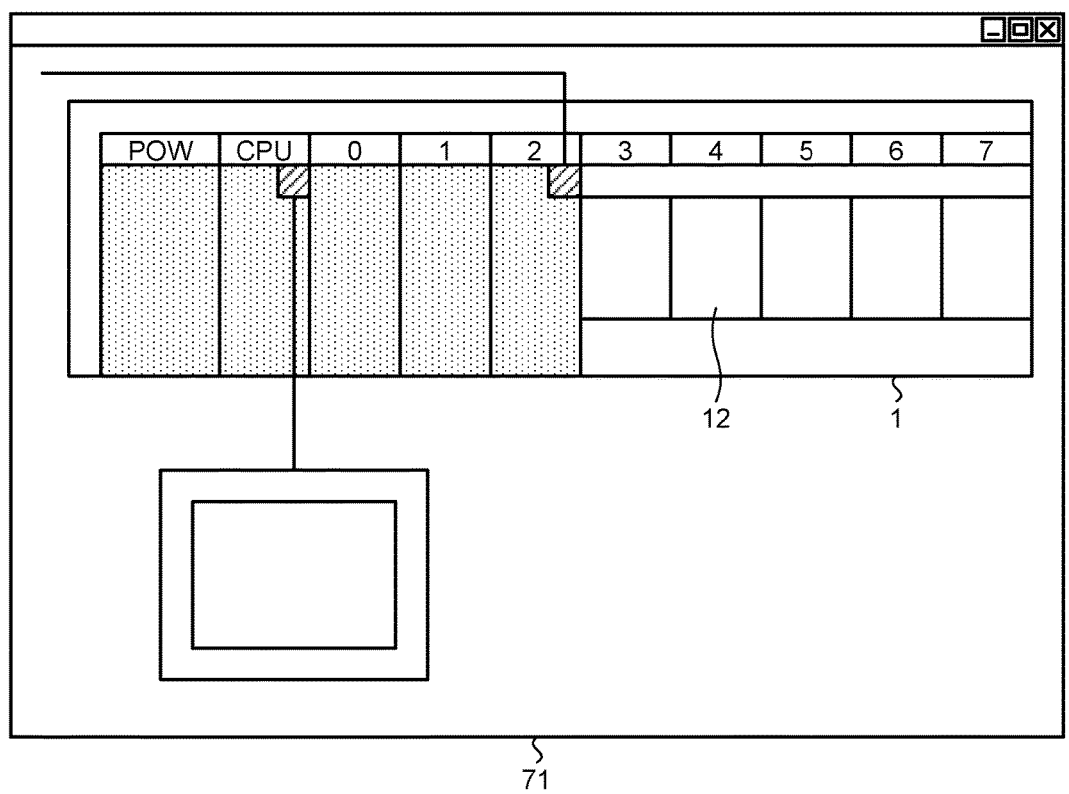
FIG. 6 is a diagram illustrating an example of a system configuration displaying screen in an engineering tool.

FIG. 6 is a diagram illustrating an example of a system configuration displaying screen in the engineering tool. In constructing the programmable logic controller 10 by combining a plurality of PLC units, system configuration information indicating what type of PLC unit is to be connected to each of a plurality of slots 12 provided on the base 1 is created by a user's input operation on a system configuration screen 71 of the engineering tool.

Figure 7:
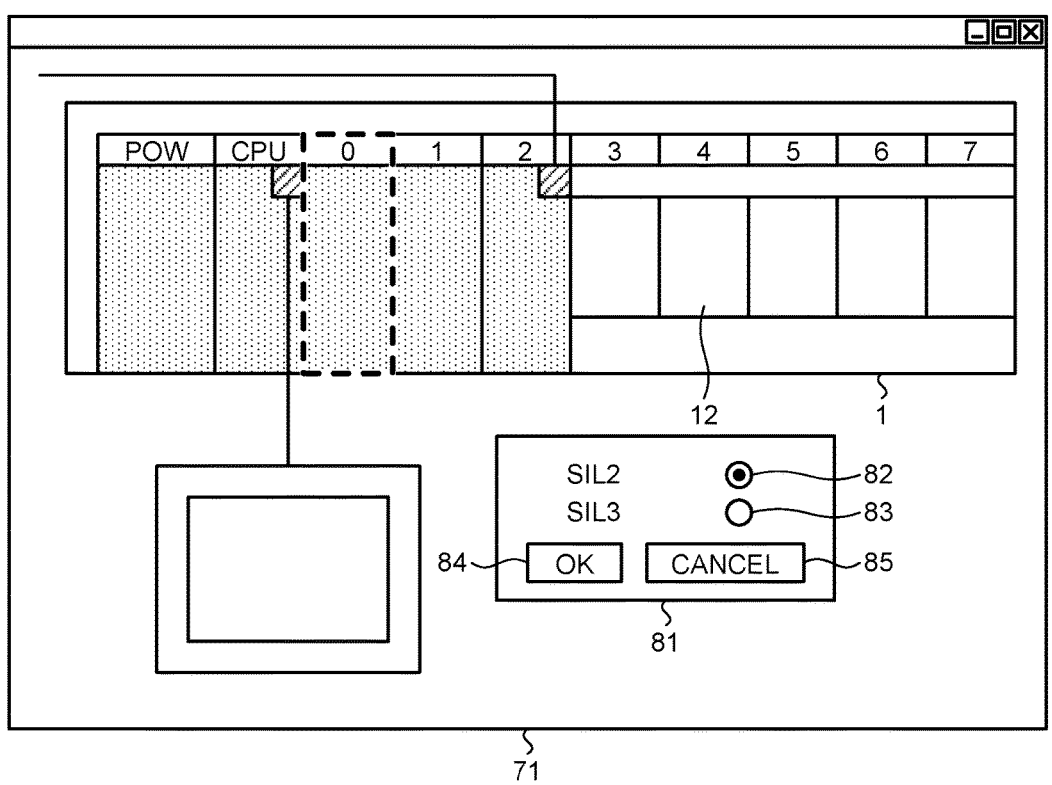
FIG. 7 is a diagram illustrating an example of an SIL setting screen.

An SIL setting screen for a designated PLC unit can be called by performing an operation to designate the PLC unit on the system configuration displaying screen 71. FIG. 7 is a diagram illustrating an example of the SIL setting screen, and illustrates a state in which a PLC unit connected to a slot 12 with a slot number 0, as surrounded by a broken line, is selected. A selection dialog 81 provided with a radio button 82 for the SIL2-compliant and a radio button 83 for the SIL3-compliant is displayed as the SIL setting screen on the system configuration screen 71 in an overlapped manner. When the radio button 82 for the SIL2-compliant or the radio button 83 for the SIL3-compliant is selected on the selection dialog 81 and then an OK button 84 is pressed, the content selected on the selection dialog 81 is retained in the engineering tool. In a case where a cancel button 85 is pressed, the content selected on the selection dialog 81 is discarded without being retained in the engineering tool. The SIL setting of each PLC unit retained in the engineering tool is transferred from the engineering tool to the programmable logic controller 10 when a writing operation to the programmable logic controller 10 is performed on the engineering tool. As a result, the SIL setting set on the engineering tool is reflected in each PLC unit.

It is also possible that system configuration information, that is, information on how the programmable logic controller 10 is being configured by what type of PLC unit is connected to each of the plurality of slots 12 of the base 1 is stored in a device memory not shown of the programmable logic controller 10. When the operation for displaying the system configuration of the programmable logic controller 10 is performed on the engineering tool, the engineering tool reads the system configuration information from the device memory not shown of the programmable logic controller 10, and displays the system configuration of the programmable logic controller 10 on the system configuration screen.

Figure 8:
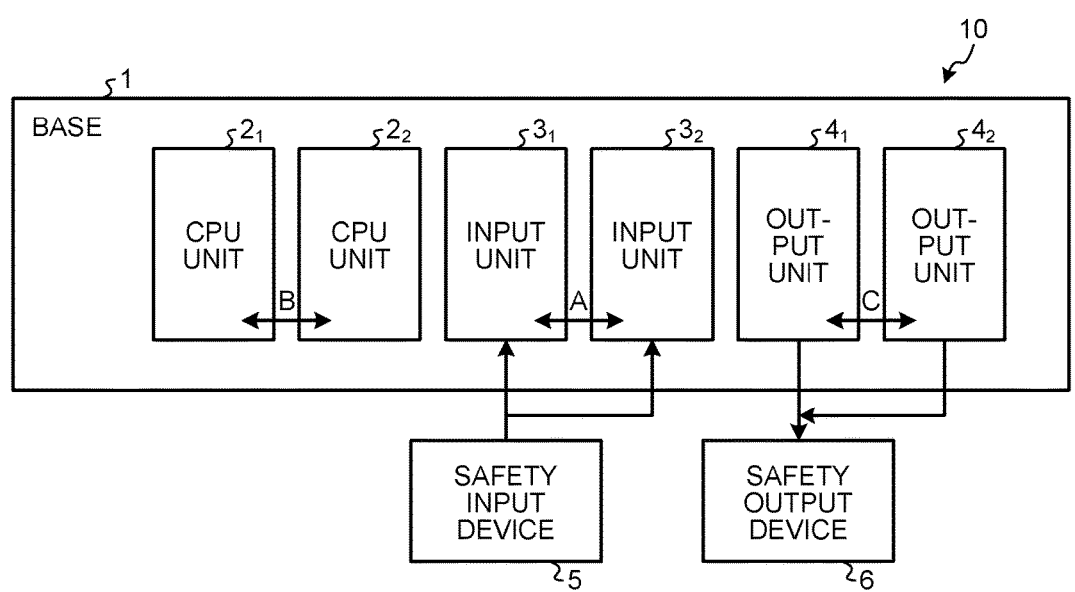
FIG. 8 is a diagram illustrating another configuration of the programmable logic controller using the PLC unit according to the present embodiment.

FIG. 8 is a diagram illustrating another configuration of the programmable logic controller using the PLC unit according to the embodiment. The programmable logic controller is provided with a base 1, CPU units 2 ($2_1$, $2_2$), input units 3 ($3_1$, $3_2$), and output units 4 ($4_1$, $4_2$). It should be noted that although the two CPU units 2 have the same configuration, they can be distinguished from each other by denoting them with a subscript added to the reference sign: CPU unit $2_1$, CPU unit $2_2$. These are for the sake of convenience for explaining the present embodiment. The configuration of each of them is identical to that of the CPU unit 2 shown in FIG. 3. The same applies to the input units $3_1$, $3_2$, and the output units $4_1$, $4_2$. That is, a configuration of each of the input units $3_1$, $3_2$ is identical to that of the input unit 3 shown in FIG. 4, and a configuration of each of the output units $4_1$, $4_2$ is identical to that of the output unit 4 shown in FIG. 5.

The CPU units $2_1$, $2_2$, the input units $3_1$, $3_2$, and the output units $4_1$, $4_2$ are dualized respectively. Further, each of the CPU units $2_1$, $2_2$, the input units $3_1$, $3_2$, and the output units $4_1$, $4_2$ has the SFF of 90% or more. Since the CPU units $2_1$, $2_2$, the input units $3_1$, $3_2$, and the output units $4_1$, $4_2$ are dualized respectively and thus the HFT is 1, the programmable logic controller 10 complies with the SIL3.

The CPU units $2_1$, $2_2$, the input units $3_1$, $3_2$, and the output units $4_1$, $4_2$ configuring the programmable logic controller 10 retain, in the respective SIL setting retaining units 21, 31, and 41, information indicating the SIL3-compliant setting, namely, information that indicates using each unit by the dualization.

Figure 9:
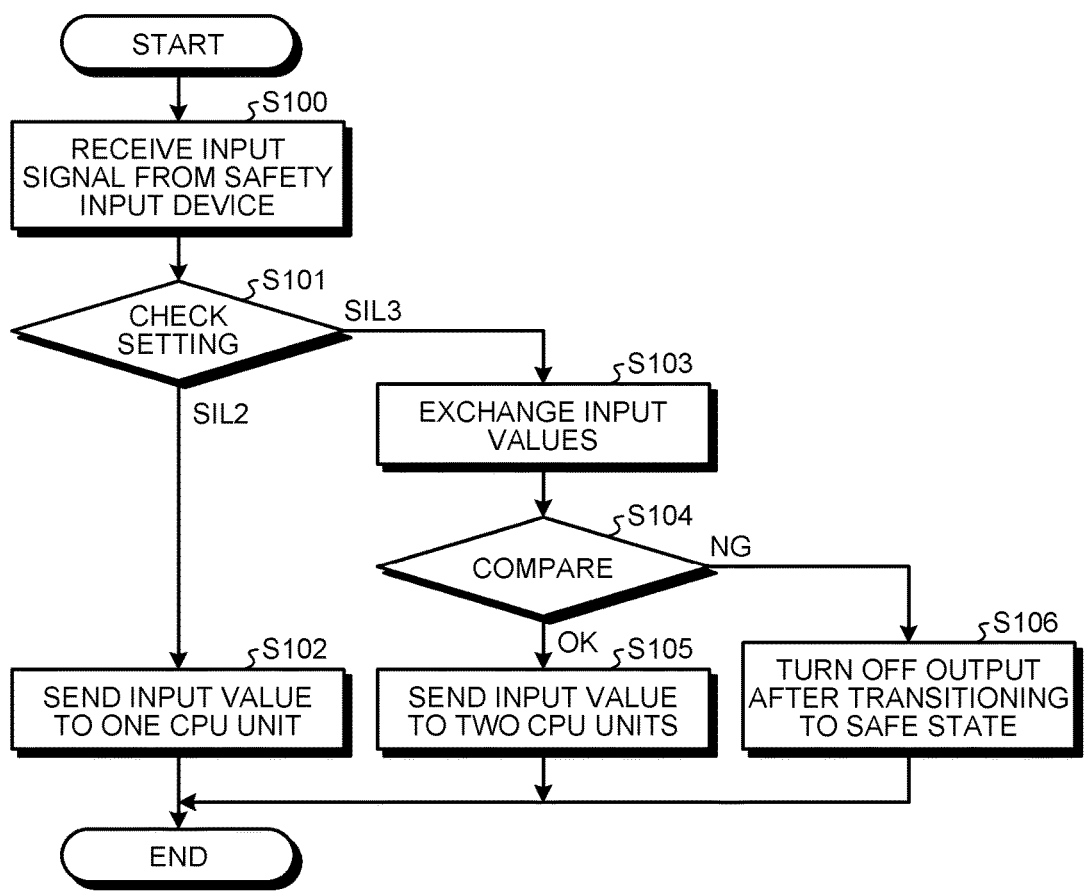
FIG. 9 is a diagram illustrating a flow of an operation of the input unit.

FIG. 9 is a diagram illustrating a flow of an operation of the input unit. The input signal receiving unit 32 receives an input signal from the safety input device 5 (step S100). The input value sending unit 34 checks whether the information retained in the SIL setting retaining unit 31 indicates the SIL2 or the SIL3 (step S101). If the information retained in the SIL setting retaining unit 31 indicates the SIL2 (step S101/SIL2), the input value sending unit 34 sends the input value to one CPU unit 2 through the system bus I/F function unit 35 (step S102).

If the information retained in the SIL setting retaining unit 31 indicates the SIL3 (step S101/SIL3), the input value comparing unit 33 obtains an input value from a counterpart input unit 3 being a counterpart of the dualization through the system bus I/F function unit 35, and also sends, to the counterpart input unit 3, the input value received from the input signal receiving unit 32, thereby exchanging the input values (step S103). Since the system bus I/F function unit 35 is provided with the bus master 351 having the master function, it can obtain the input value by directly sending an access request to the counterpart input unit 3, without through the CPU unit 2. It should be noted that an arrow A in FIG. 8 indicates that the input value comparing unit 33 obtains the input value from the counterpart input unit 3 through the system bus I/F function unit 35.

The input value comparing unit 33 makes a comparison between the input value received from the input signal receiving unit 32 and the input value obtained from the counterpart input unit 3 (step S104). That is, in the case of the input unit 3, processed information is the input value and the input value comparing unit 33 serves as an information comparing unit. If a result of the comparison indicates that the input values are consistent with each other (step S104/OK), the input value sending unit 34 outputs the input value to the two CPU units 2 through the system bus I/F function unit 35 (step S105). On the other hand, if the result of the comparison indicates that the input values are not consistent with each other (step S104/NG), an error process that turns off the output after having transitioned to a safe state is performed (step S106). In this case, the input unit 3 notifies the CPU unit 2 of the comparison inconsistency, the CPU unit 2 that has received the notification from the input unit 3 sends a stop signal to the output unit 4, and the output unit 4 stops the output, thereby transitioning to the safe state and turning off the output.

Note that when the information retained in the SIL setting retaining unit 31 indicates the SIL3, the input unit 3 is dualized with the counterpart input unit 3. In this case, the two input units 3 mutually obtain the input values from the counterpart input units 3 to make the comparison, and the input value sending units 34 send the input value to the CPU units 2 if both of the comparison results in the respective input units 3 indicate consistency. Note that obtaining the input value from the counterpart input unit 3 and making the comparison are performed by both of the two input units 3. However, the sending of the input value to the CPU unit 2 may be performed only by one of them.

Figure 10:
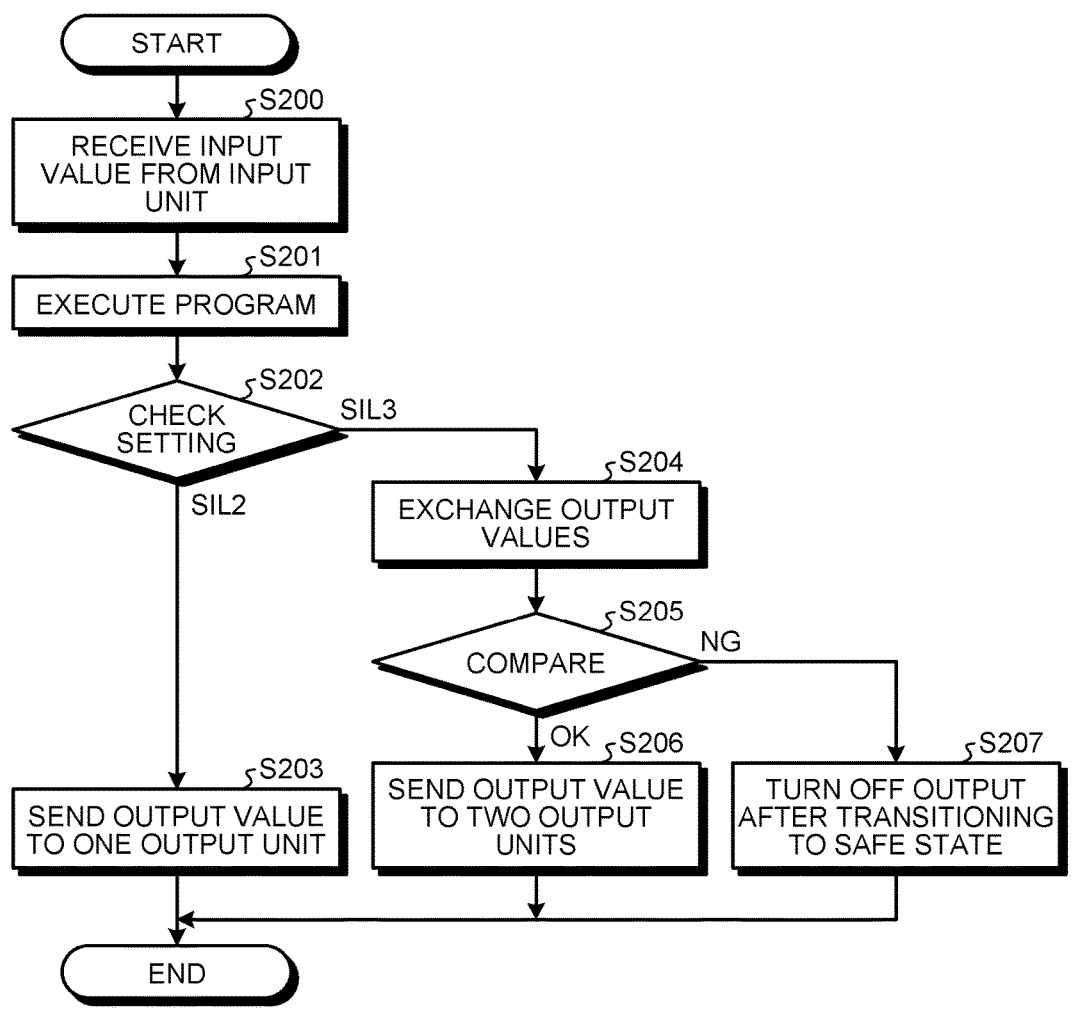
FIG. 10 is a diagram illustrating a flow of an operation of the CPU unit.

FIG. 10 is a diagram illustrating a flow of an operation of the CPU unit. The input value receiving unit 22 receives the input value from the input unit 3 (step S200). After that, the program executing unit 23 executes a sequence program to generate an output value (step S201). The output value sending unit 25 checks whether the information retained in the SIL setting retaining unit 21 indicates the SIL2 or the SIL3 (step S202). If the information retained in the SIL setting retaining unit 21 indicates the SIL2 (step S202/SIL2), the output value sending unit 25 sends the output value to one output unit 4 through the system bus I/F function unit 26 (step S203).

If the information retained in the SIL setting retaining unit 21 indicates the SIL3 (step S202/SIL3), the calculation result comparing unit 24 obtains a calculation result from a counterpart CPU unit 2 being a counterpart of the dualization through the system bus I/F function unit 26, and also sends, to the counterpart CPU unit 2, the calculation result received from the program executing unit 23, thereby exchanging the calculation results (step S204). Since the system bus I/F function unit 26 is provided with the bus master 261 having the master function, it can obtain the calculation result by directly sending an access request to the counterpart CPU unit 2. It should be noted that an arrow B in FIG. 8 indicates that the calculation result comparing unit 24 obtains the calculation result from the counterpart CPU unit 2 through the system bus I/F function unit 26.

The calculation result comparing unit 24 makes a comparison between the calculation result received from the program executing unit 23 and the calculation result obtained from the counterpart CPU unit 2 (step S205). That is, in the case of the CPU unit 2, processed information is the calculation result and the calculation result comparing unit 24 serves as an information comparing unit. If a result of the comparison indicates that the calculation results are consistent with each other (step S205/OK), the output value sending unit 25 outputs the calculation result to the two output units 4 through the system bus I/F function unit 26 (step S206). On the other hand, if the result of the comparison indicates that the calculation results are not consistent with each other (step S205/NG), an error process that turns off the output after having transitioned to a safe state is performed (step S207). In this case, the CPU unit 2 sends a stop signal to the output unit 4, and the output unit 4 stops the output, thereby transitioning to the safe state and turning off the output.

Note that when the information retained in the SIL setting retaining unit 21 indicates the SIL3, the CPU unit 2 is dualized with the counterpart CPU unit 2. In this case, the two CPU units 2 mutually obtain the calculation results from the counterpart CPU units 2 to make the comparison, and the output value sending units 25 send the output value to the output units 4 if both of the comparison results in the respective CPU units 2 indicate consistency. Note that obtaining the calculation result from the counterpart CPU unit 2 and making the comparison are performed by both of the two CPU units 2. However, the sending of the output value to the output unit 4 may be performed only by one of them.

In a case where the input values are sent from both of the dualized two input units 3 to the input value receiving unit 22, the program may be executed by using either one of the input values. For example, the following setting may be preset; that is, the program executing unit 23 executes the program by using the input value received from an input unit 3, among the two input units 3, that is mounted on the slot 12 closer to the CPU unit 2.

Figure 11:
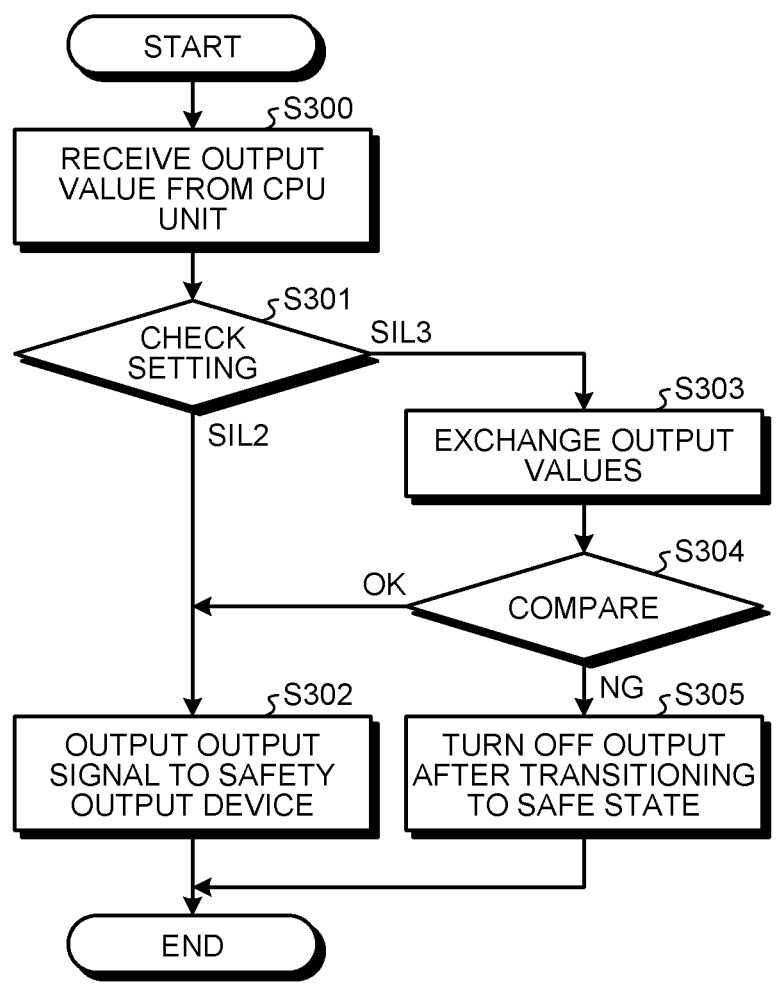
FIG. 11 is a diagram illustrating a flow of an operation of the output unit.

FIG. 11 is a diagram illustrating a flow of an operation of the output unit. The output value receiving unit 42 receives the output value from the CPU unit 2 (step S300). The output signal sending unit 44 checks whether the information retained in the SIL setting retaining unit 41 indicates the SIL2 or the SIL3 (step S301). If the information retained in the SIL setting retaining unit 41 indicates the SIL2 (step S301/SIL2), the output signal sending unit 44 sends the output value as an output signal to the safety output device 6 through the system bus I/F function unit 45 (step S302).

If the information retained in the SIL setting retaining unit 41 indicates the SIL3 (step S301/SIL3), the output value comparing unit 43 obtains an output value from a counterpart output unit 4 being a counterpart of the dualization through the system bus I/F function unit 45, and also sends, to the counterpart output unit 4, the output value received from the output value receiving unit 42, thereby exchanging the output values (step S303). Since the system bus I/F function unit 45 is provided with the bus master 451 having the master function, it can obtain the output value by directly sending an access request to the counterpart output unit 4, without through the CPU unit 2. It should be noted that an arrow C in FIG. 8 indicates that the output value comparing unit 43 obtains the output value from the counterpart output unit 4 through the system bus I/F function unit 45.

The output value comparing unit 43 makes a comparison between the output value received from the output value receiving unit 42 and the output value obtained from the counterpart output unit 4 (step S304). That is, in the case of the output unit 4, processed information is the output value and the output value comparing unit 43 serves as an information comparing unit. If a result of the comparison indicates that the output values are consistent with each other (step S304/OK), the output signal sending unit 44 sends the output signal to the safety output device 6 through the system bus I/F function unit 45 (step S302). On the other hand, if the result of the comparison indicates that the output values are not consistent with each other (step S304/NG), an error process that turns off the output after having transitioned to a safe state is performed (step S305). In this case, the output unit 4 stops sending the output signal to the safety output device 6.

Note that when the information retained in the SIL setting retaining unit 41 indicates the SIL3, the output unit 4 is dualized with the counterpart output unit 4. In this case, the two output units 4 mutually obtain the output values from the counterpart output units 4 to make the comparison, and the output signal sending units 44 send the output signal to the safety output device 6 if both of the comparison results in the respective output units 4 indicate consistency. Note that obtaining the output value from the counterpart output unit 4 and making the comparison are performed by both of the two output units 4. However, the sending of the output value to the safety output device 6 may be performed only by one of them.

In a case where the output values are sent from both of the dualized two CPU units 2 to the output value receiving unit 42, the comparison may be performed by using either one of the output values. For example, the following setting may be preset; that is, the output value comparing unit 43 makes the comparison by using the output value received from a CPU unit 2, among the two CPU units 2, that is mounted on the slot closer to the output unit 4.

It should be noted that in a case where an SIL2-compliant unit and an SIL3-compliant unit are mixed in the CPU units 2, the input units 3 and the output units 4, each unit operates in accordance with its setting and the programmable logic controller 10 as an entire system complies with the SIL2 of the safety standard.

Figure 12:
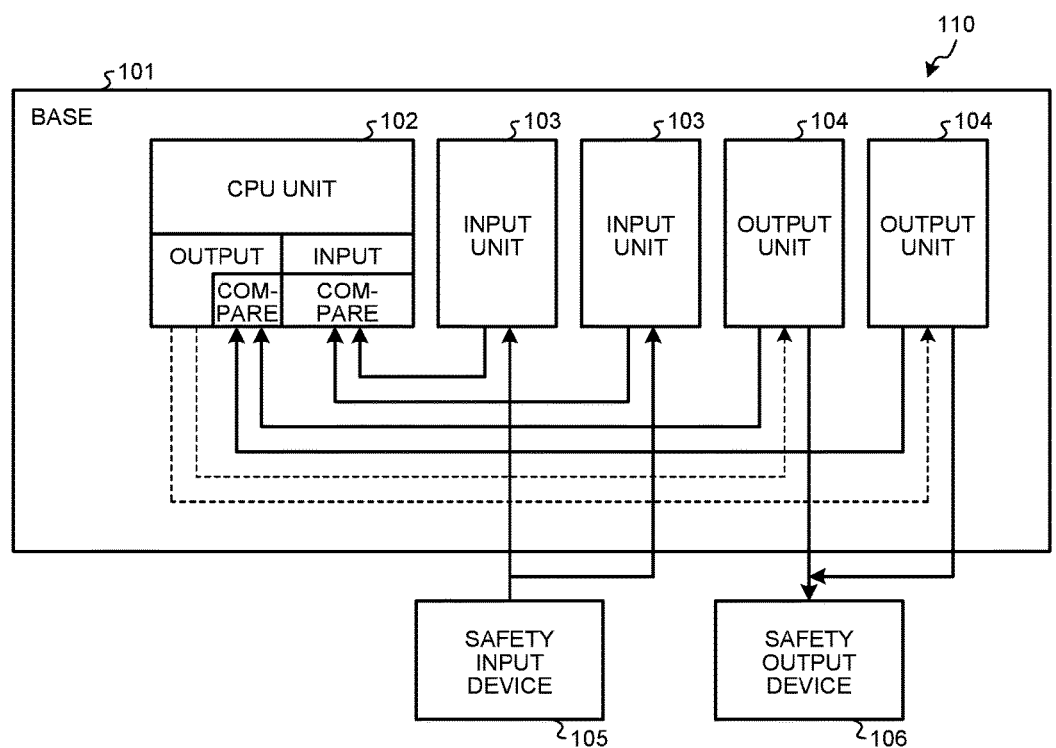
FIG. 12 is a diagram illustrating a configuration of a programmable logic controller that is made SIL3 compliant by dualizing each of an input unit and an output unit that do not have a master function.

For a comparison with the SIL3-compliant programmable logic controller 10 that dualized input units and output units having the master function, an SIL3-compliant programmable logic controller that dualized input units and output units not having the master function will be described below. FIG. 12 is a diagram illustrating a configuration of the SIL3-compliant programmable logic controller that dualized the input units and the output units that do not have the master function. In a programmable logic controller 110, one CPU unit 102 that execute a program, two input units 103 that receive an input signal from a safety input device 105, and two output units 104 that output output signals to a safety output device 106 are mounted on a same base 101. The SFF of the CPU unit 102 which is not dualized is 90% or more, and the SFF of the dualized input unit 103 and the dualized output unit 104 is 60% or more.

In the programmable logic controller 110 as described above, each of the input units 103 receives an input signal from the safety input device 105, and sends the signal to the CPU unit 102. The CPU unit 102 compares the input values received from the respective input units 103 and, when the input values are consistent with each other, executes the program and outputs the output value to each of the output units 104. Each of the output units 104 sends the output value received from the CPU unit 102 to the CPU unit 102, and requests the CPU unit 102 to make a comparison. If the comparison result of "consistency" is notified from the CPU unit 102, the output unit 104 outputs the output value to the safety output device 106.

If the signals are not consistent with each other, the output is turned off after having transitioned to the safe state, in either case.

A communication method will be described below. The CPU unit 102, and the input units 103 and the output units 104 being controlled units are mounted on the base 101. Only the CPU unit 102 has the master function of being able to send an access request command to any unit mounted on the base 101. On the other hand, the input units 103 and the output units 104 being the controlled units are slaves of the CPU unit 102, and thus they cannot send an access request command to the CPU unit 102 or other controlled units.

As an example of an operation at a time of communication, the CPU unit 102 sends an access request command to a controlled unit through a bus. Then, a logic circuit reads the access request command and sends a select signal to the controlled unit being the access destination. Here, the controlled unit being the access destination is specifically the input unit 103 or the output unit 104. The controlled unit having received the select signal returns a response to the CPU unit 102 through the bus.

In the SIL3-compliant programmable logic controller 110 that dualizes the input units 103 and the output units 104 not having the master function and the CPU unit 102 having the master function, when an access request command is to be sent to any controlled unit, only the CPU unit 102 having the master function can send the access request command to the controlled unit. Therefore, in the SIL3-compliant programmable logic controller that dualizes the input units and output units not having the master function, it is necessary to use the CPU unit 102 for exchanging data between the controlled units, and thus the comparison of the input signals and the comparison of the output values are performed by the CPU unit 102.

In the programmable logic controller 110 in which only the CPU unit 102 has the master function, as described above, the CPU unit 102 performs the comparison every time the input values or the output values need to be compared, which causes deterioration in the response performance. When the response performance becomes low, a safety distance becomes longer and thus safety cannot be assured. Thus, even if the programmable logic controller 110 is made to comply with the SIL3 which requires higher degree of safety than the SIL2, its use application is limited.

On the other hand, in a case where the HFT is 0, the SIL3-compliant unit is required to have the SFF of 99% or more. In other words, in a case where a single unit is made to comply with the SIL3 without dualization, the SFF of the unit needs to be 99% or more. Moreover, the SIL3-compliant unit is required to have the SFF of 90% or more in a case where the HFT is 1 and the SFF of 60% or more in a case where the HFT is 2.

Figure 13:
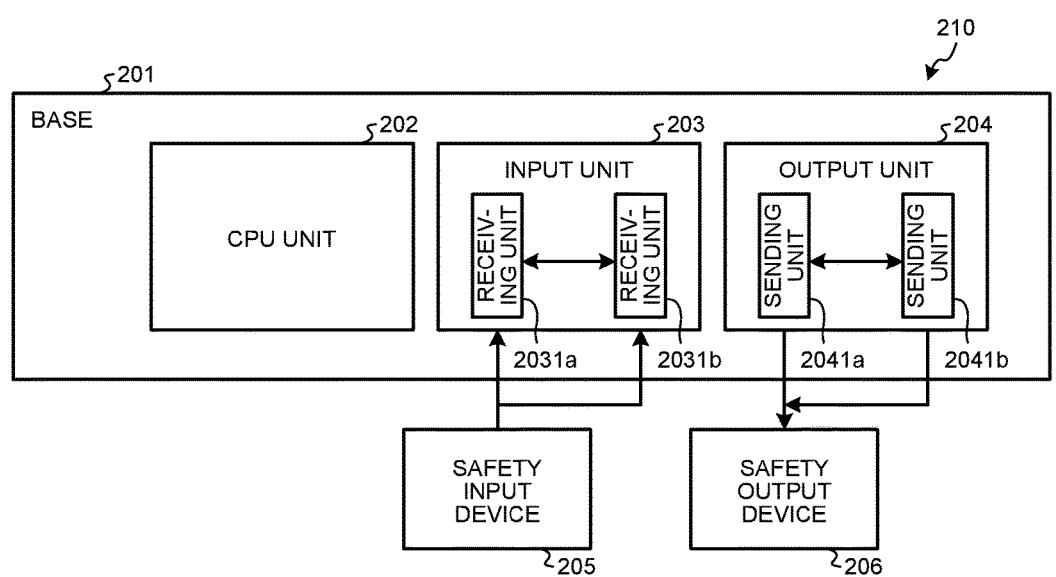
FIG. 13 is a diagram illustrating a configuration of a programmable logic controller that is made SIL3 compliant by using a unit which complies with the SIL3 when used alone.

FIG. 13 is a diagram illustrating a configuration of a programmable logic controller that is made SIL3 compliant by using a unit which complies with the SIL3 when used alone. As an example of a system configuration that complies with the SIL3, one CPU unit 202 that executes a program, one input unit 203 that receives an input signal from a safety input device 205, and one output unit 204 that outputs an output signal to a safety output device 206 are mounted on a same base 201 in a programmable logic controller 210. Here, an internal of the input unit 203 is dualized, and an internal of the output unit 204 is dualized. The SFF of the CPU unit 202 not being dualized is 99% or more. The SFF of each of the input unit 203 and the output unit 204 which are internally dualized is 90% or more.

In the programmable logic controller 210, the input unit 203 receives the input signal from the safety input device 205 by each of dualized receiving units 2031a, 2031b. The input unit 203 compares the input signals received by the respective receiving units 2031a, 2031b through an internal bus and, when the input signals are consistent with each other, outputs an input value to the CPU unit 202. The CPU unit 202 executes a program and outputs an output value to the output unit 204. The output unit 204 receives the output value by each of dualized sending units 2041a, 2041b. Then, the output unit 204 compares the output values received by the respective sending units 2041a, 2041b through an internal bus and, when the output signals are consistent with each other, sends an output signal to the safety output device 206.

If the signals are not consistent with each other, the output is turned off after having transitioned to the safe state, in either case.

In the programmable logic controller 210, each unit is the SIL3-compliant unit. Therefore, when an SIL2-compliant system is constructed by using such the unit, reliability and redundancy of each unit becomes excessive, which causes increase in costs required for the system construction.

As described above, in the programmable logic controller according to the present embodiments, each of the CPU units, the input units, and the output units has the master function. It is therefore possible to exchange data without through the CPU unit. Accordingly, even in the case where the input signals or the output values need to be compared due to the dualization, it is possible to prevent increase in the load of the CPU unit and thus to prevent the deterioration in the response performance. As a result, it is possible to integrate units for the SIL2-compliant system and units for the SIL3-compliant system.

Figure 14:
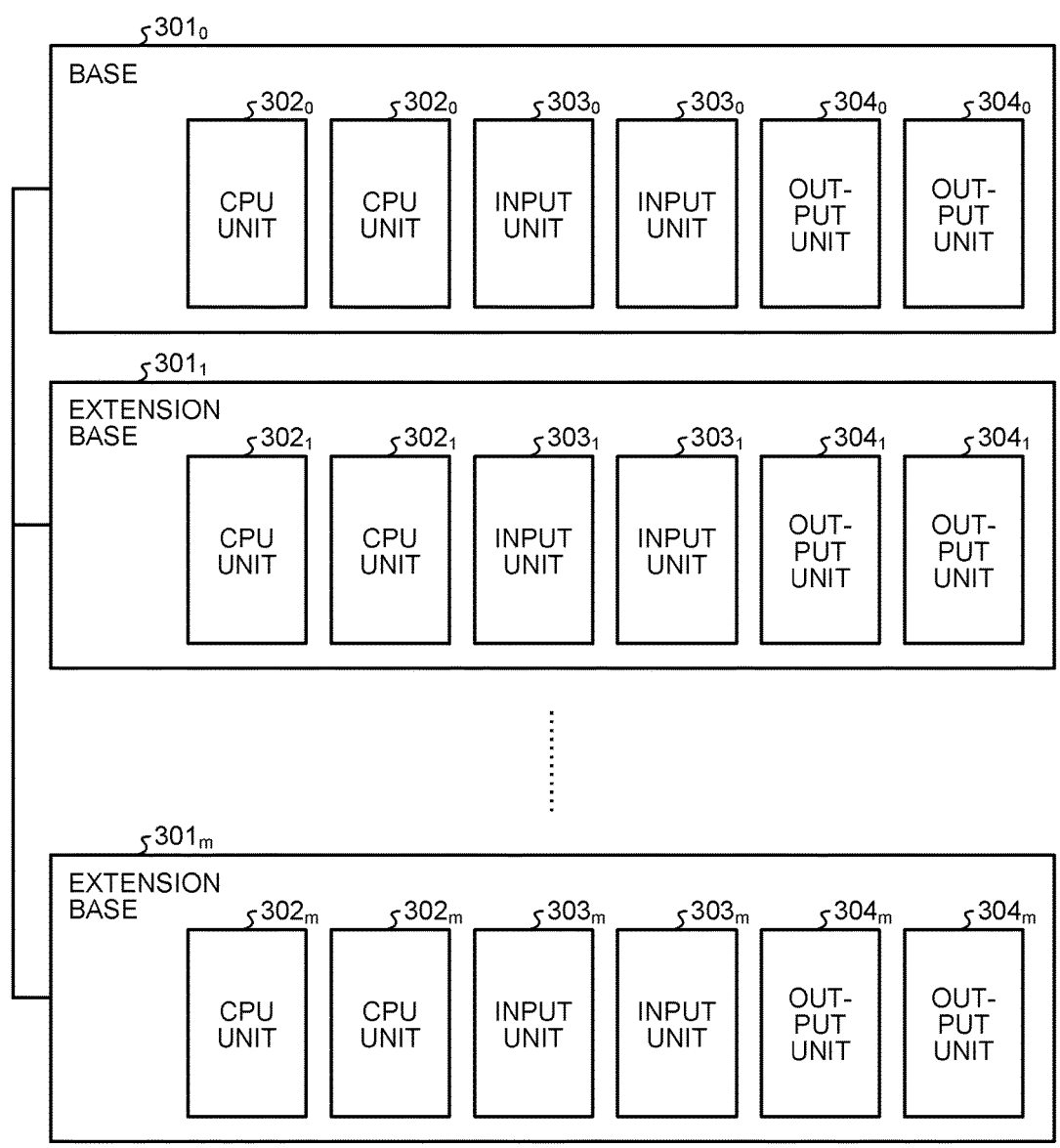
FIG. 14 is a diagram illustrating an example of a configuration of a programmable logic controller that uses an extension base.

It should be noted that although the above-described embodiment is exemplified by a configuration where the CPU units, the input units, and the output units are mounted on a fundamental base, it is also possible to configure a programmable logic controller by mounting one or more CPU units, one or more input units, and one or more output units on any base of bases including an extension base. FIG. 14 is a diagram illustrating an example of a configuration of a programmable logic controller that uses an extension base. CPU units $302_0$, $302_0$, input units $303_0$, $303_0$, and output units $304_0$, $304_0$ are mounted on a base $301_0$. The base $301_0$ is connected to m pieces of extension bases $301_1$ to $301_m$ (here, m is an arbitrary natural number). CPU units $302_1$, $302_1$ to $302_m$, $302_m$, input units $303_1$, $303_1$ to $303_m$, $303_m$, and output units $304_1$, $304_1$ to $304_m$, $304_m$ are mounted on the extension bases $301_1$ to $301_m$, respectively. The CPU units, the input units, and the output units according to the present embodiment can configure a programmable logic controller by using an extension base.

In the above description, examples were given of cases in which compliance with the SIL2 of the safety level standard is achieved by using each unit alone and compliance with the SIL 3 of the safety level standard is achieved by using the units in a dualized manner. However, the safety level is not limited to the SIL2 and the SIL3, as long as compliance with two types of safety level standards can be achieved by switching the case where the unit is used alone and the case where the unit is used by the dualization. For example, ISO13849-1 is a standard in which a case where a unit having one input channel and one output channel is used alone corresponds to a safety category 2, and a case where two units each having one input channel and one output channel are used in a dualized manner corresponds to a safety category 3 or 4. The present invention can also be applied to achieve compliance with the ISO13849-1 standard.

INDUSTRIAL APPLICABILITY

As described above, the CPU unit, the input unit, the output unit, and the programmable logic controller according to the present invention are useful in that they can comply with both the SIL2 and SIL3 without increasing load of the CPU unit and without making the reliability and redundancy of each unit excessive.

REFERENCE SIGNS LIST 1, 101, 201, $301_0$ BASE; 2, 102, 202, $302_0$, $302_1$, $302_m$ CPU UNIT; 3, 103, 203, $303_0$, $303_1$, $303_m$ INPUT UNIT; 4, 104, 204, $304_0$, $304_1$, $304_m$ OUTPUT UNIT; 5, 105, 205 SAFETY INPUT DEVICE; 6, 106, 206 SAFETY OUTPUT DEVICE; 10, 110 PROGRAMMABLE LOGIC CONTROLLER; 11 LOGIC CIRCUIT; 12 SLOT; 13 SYSTEM BUS; 21, 31, 41 SIL SETTING RETAINING UNIT; 22 INPUT VALUE RECEIVING UNIT; PROGRAM EXECUTING UNIT; 24 CALCULATION RESULT COMPARING UNIT; 25 OUTPUT VALUE SENDING UNIT; 26, 35, 45 SYSTEM BUS I/F FUNCTION UNIT; 32 INPUT SIGNAL RECEIVING UNIT; 33 INPUT VALUE COMPARING UNIT; 34 INPUT VALUE SENDING UNIT; 42 OUTPUT VALUE RECEIVING UNIT; 43 OUTPUT VALUE COMPARING UNIT; 44 OUTPUT SIGNAL SENDING UNIT; 71 SYSTEM CONFIGURATION SCREEN; 81 SELECTION DIALOG; 82, 83 RADIO BUTTON, 84 OK BUTTON; 85 CANCEL BUTTON; 261, 351, 451 BUS MASTER; $301_1$, $301_m$ EXTENSION BASE; 2031a, 2031b RECEIVING UNIT; and 2041a, 2041b SENDING UNIT.

The invention claimed is:

1. A programmable logic controller system comprising:
an input unit system section in which a plurality of input units are combined, each of the input units including a section configured to receive an input signal from a safety input device to extract an input value, to send the input value to a corresponding CPU unit among a plurality of CPU units, and to directly send and receive data to and from another input unit connected to the section via an input unit system bus;

a CPU unit system section in which the plurality of CPU units are combined, each of the CPU units including a section configured to execute a program based on the input value received from the corresponding input unit to generate a calculation result, to send the calculation result as an output value to a corresponding output unit among a plurality of output units, and to directly send and receive data to and from another CPU unit connected to the section via a CPU unit system bus; and an output unit system section in which the plurality of output units are combined, each of the output units including a section configured to send, to a safety output device, an output signal generated based on the output value received from the corresponding CPU unit, and to directly send and receive data to and from another output unit connected to the section via an output unit system bus, wherein the input unit system section includes:
  a first setting retaining unit configured to retain a setting indicating whether to use any of the plurality of input units alone or use the plurality of input units in a multiplexed manner; and
  a first comparing unit configured to make a comparison of the input value between the plurality of input units in a case where the setting indicates using the plurality of input units in a multiplexed manner, to send the input value to one of the CPU units if a result of the comparison indicates consistency, and to perform an error process if the result of the comparison indicates inconsistency, wherein the CPU unit system section includes:
  a second setting retaining unit configured to retain a setting indicating whether to use any of the plurality of CPU units alone or use the plurality of CPU units in a multiplexed manner; and
  a second comparing unit configured to make a comparison of the calculation result between the plurality of CPU units in a case where the setting indicates using the plurality of CPU units in a multiplexed manner, to send the calculation result to one of the output units if a result of the comparison indicates consistency, and to perform an error process if the result of the comparison indicates inconsistency, wherein the output unit system section includes:
  a third setting retaining unit configured to retain a setting indicating whether to use any of the plurality of output units alone or use the plurality of output units in a multiplexed manner; and
  a third comparing unit configured to make a comparison of the output value between the plurality of output units in a case where the setting indicates using the plurality of output units in a multiplexed manner, to send the output value to the safety output device if a result of the comparison indicates consistency, and to perform an error process if the result of the comparison indicates inconsistency, and wherein in the first setting retaining unit, the second setting retaining unit, and the third setting retaining unit, whether to use alone or in a multiplexed manner is set based on an externally-input setting instruction, and wherein the first comparing unit makes the comparison without using any processing operations of the CPU units, thereby reducing a processing load on the CPU units as compared to a configuration in which the input units transmit the data to one of the CPU units to make the comparison.

2. The programmable logic controller system according to claim 1, further comprising an engineering tool comprising:
  a system configuration displaying unit configured to display a system configuration including the input unit system section, the CPU unit system section, and the output unit system section;
  a selection unit configured to receive user input selecting whether to use each of a plurality of units included in the displayed system configuration alone or in a multiplexed manner; and
  a setting instruction unit configured to instruct a unit for which using in a multiplexed manner is selected by the selection unit to perform setting of using in a multiplexed manner.

3. An input unit system in which a plurality of input units are combined, each of the input units including a section configured to receive an input signal from a safety input device to extract an input value, to send the input value to a CPU unit, and to directly send and receive data to and from another input unit connected to the section via an input unit system bus,
  wherein each of the input units in the input unit system includes:
    a first setting retaining unit configured to retain a setting indicating whether to use any of the plurality of input units alone or use the plurality of input units in a multiplexed manner; and
    a first comparing unit configured to make a comparison of the input value between the plurality of input units in a case where the setting indicates using the plurality of input units in a multiplexed manner, to send the input value to the CPU unit if a result of the comparison indicates consistency, and to perform an error process if the result of the comparison indicates inconsistency,
  wherein in the first setting retaining unit, whether to use alone or in a multiplexed manner is set based on an externally-input setting instruction, and
  wherein the first comparing unit makes the comparison without using any processing operations of the CPU unit, thereby reducing a processing load on the CPU unit as compared to a configuration in which the input units transmit the data to the CPU unit to make the comparison.

4. A CPU unit system in which a plurality of CPU units are combined, each of the CPU units including a section configured to execute a program based on an input value received from an input unit to generate a calculation result, to send the calculation result as an output value to an output unit, and to directly send and receive data to and from another CPU unit connected to the section via a CPU unit system bus,
  wherein the CPU unit system includes:
    a second setting retaining unit configured to retain a setting indicating whether to use any of the plurality of CPU units alone or use the plurality of CPU units in a multiplexed manner;
    a section configured to cause the CPU units to directly send and receive data to and from each other via the CPU unit system bus; and
    a second comparing unit configured to make a comparison of the calculation result between the plurality of CPU units in a case where the setting indicates using the plurality of CPU units in a multiplexed manner, to send the calculation result to the output unit if a result of the comparison indicates consistency, and to perform an error process if the result of the comparison indicates inconsistency, wherein in the second setting retaining unit, whether to use alone or in a multiplexed manner is set based on an externally-input setting instruction, and wherein the input value received from the input unit is a value which is generated based on the input unit and another input unit exchanging input data with each other to make a comparison, without using any processing operations of the CPU units, thereby reducing a processing load on the CPU units as compared to a configuration in which the input unit and the other input unit transmit the input data to one of the CPU units to make the comparison.

5. An output unit system in which a plurality of output units are combined, each of the output units including a section configured to send, to a safety output device, an output signal generated based on an output value received from a CPU unit, and to directly send and receive data to and from another output unit connected to the section via an output unit system bus, wherein the output unit system includes:
a third setting retaining unit configured to retain a setting indicating whether to use any of the plurality of output units alone or use the plurality of output units in a multiplexed manner; and
a third comparing unit configured to make a comparison of the output value between the plurality of output units in a case where the setting indicates using the plurality of output units in a multiplexed manner, to send the output value to the safety output device if a result of the comparison indicates consistency, and to perform an error process if the result of the comparison indicates inconsistency, wherein in the third setting retaining unit, whether to use alone or in a multiplexed manner is set based on an externally-input setting instruction, and wherein the third comparing unit makes the comparison without using any processing operations of the CPU unit, thereby reducing a processing load on the CPU unit as compared to a configuration in which the output units transmit the data to one of the CPU units to make the comparison.

* * * * *